United States Patent [19]

Knobloch

[11] Patent Number: 5,059,661

[45] Date of Patent: Oct. 22, 1991

[54] PHENOLIC COMPOUNDS AS CHAIN-TERMINATORS FOR THE ANIONIC SOLUTION POLYMERIZATION OF DIENES

[75] Inventor: Gerrit Knobloch, Magden, Switzerland

[73] Assignee: Ciba-Geigy Corporation, Ardsley, N.Y.

[21] Appl. No.: 570,498

[22] Filed: Aug. 21, 1990

[30] Foreign Application Priority Data

Aug. 30, 1989 [CH] Switzerland .................. 3141/89

[51] Int. Cl.$^5$ ............................... C08F 2/38
[52] U.S. Cl. ............................. 526/84; 526/82; 526/335; 526/340; 524/330; 524/331; 524/333
[58] Field of Search .................. 526/84, 173, 181, 211, 526/82, 335, 340; 524/330, 331, 333

[56] References Cited

U.S. PATENT DOCUMENTS

| | | | |
|---|---|---|---|
| 3,110,706 | 11/1963 | Vollmert et al. ........................ | 526/84 |
| 3,458,491 | 7/1969 | Dennis .................................. | 526/84 X |
| 3,903,173 | 9/1975 | Eggensperger et al. ........ | 260/609 F |
| 4,377,666 | 3/1983 | Farrar .................................. | 525/132 |
| 4,707,300 | 11/1987 | Sturm et al. ..................... | 524/333 X |
| 4,965,326 | 10/1990 | Horpel et al. ........................ | 526/84 |

FOREIGN PATENT DOCUMENTS 0273013  6/1988  European Pat. Off. .
2148185  4/1973  Fed. Rep. of Germany ........ 526/84

Primary Examiner—Fred Teskin
Attorney, Agent, or Firm—Harry Falber

[57] ABSTRACT

Compounds of formula I

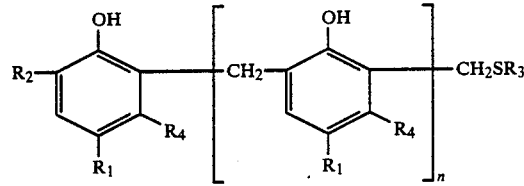

wherein n is 0 to 3, $R_1$ and $R_2$ are $C_1$–$C_{12}$alkyl, $C_5$–$C_8$-cycloalkyl or —$CH_2SR_3$, $R_3$ is $C_1$–$C_{18}$alkyl, phenyl or benzyl, and $R_4$ is hydrogen or $CH_3$, are admirably suitable as chain-terminators in the anionic solution polymerisation of 1,3-dienes.

6 Claims, No Drawings

PHENOLIC COMPOUNDS AS CHAIN-TERMINATORS FOR THE ANIONIC SOLUTION POLYMERIZATION OF DIENES

The present invention relates to a process for discontinuing polymerisation during the anionic solution polymerisation of 1,3-dienes.

The anionic solution polymerisation of 1,3-dienes is a process which is used in industrial technology for the preparation of polybutadiene and polyisoprene as well as for the preparation of styrene/butadiene copolymers. The polymerisation initiators used in this process are mainly organolithium compounds, especially alkyl lithium compounds which are soluble in the hydrocarbon solvents employed. A "living polymer" which carries an organolithium group at the chain end is formed. To discontinue the polymerisation it is necessary to destroy this organolithium group. This is accomplished by adding a protic compound such as water or an acid, but preferably an alcohol such as methanol. Further working up is normally effected by addition of an antioxidant and coagulation in an aqueous medium or by distillation of the solvent. The addition of the antioxidant is made before the polymer comes in contact with atmospheric oxygen. Suitable antioxidants are sterically hindered phenols, for example 2,6-di-tert-butyl-p-cresol.

Applicant's own experiments have shown that discolouration and turbidity of the solution occur when phenolic antioxidants such as 2,6-di-tert-butyl-p-cresol are added. The polymers which subsequently precipitate are likewise partially or completely discoloured. However, it has now been found that neither discolouration nor turbidity occur if very specific sulfur-containing phenolic antioxidants are added to the polymerisation solution.

Accordingly, the present invention relates to a process for discontinuing the organolithium-initiated anionic polymerisation of 1,3-dienes and the copolymerisation thereof with styrene compounds by addition of a chain-terminator to the polymerisation solution, which comprises using as chain-terminator at least one phenolic antioxidant of formula I

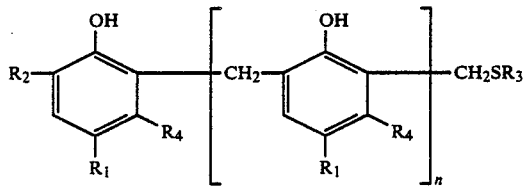

wherein n is 0 to 3, $R_1$ and $R_2$ are each independently of the other $C_1$–$C_{12}$alkyl, $C_5$–$C_8$cycloalkyl or —$CH_2SR_3$, $R_3$ is $C_1$–$C_{18}$alkyl, phenyl or benzyl, and $R_4$ is hydrogen or methyl.

$R_1$ and $R_2$ as $C_1$–$C_8$alkyl may be unbranched or branched alkyl radicals such as methyl, ethyl, n-propyl, isopropyl, n-butyl, sec-butyl, tert-butyl, isopentyl, tert-pentyl, n-hexyl, n-heptyl, n-octyl or 2-ethylhexyl. $R_3$ as $C_1$–$C_{18}$alkyl may additionally be decyl, dodecyl, tetradecyl, hexadecyl or octadecyl.

The preferred chain-terminator used in the process of this invention is a compound of formula I, wherein n is 0 or 1, $R_1$ and $R_2$ are each independently of the other $C_1$–$C_4$alkyl or —$CH_2SR_3$, $R_3$ is $C_4$–$C_{18}$alkyl, benzyl or phenyl, and $R_4$ is hydrogen.

It is especially preferred to use a compound of formula I, wherein n is 0.

Mixtures of such compounds may also be used, for example reaction mixtures which contain compounds of formula I, wherein n has different meanings.

The compound of formula

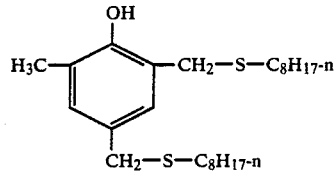

has been found especially suitable.

The chain-terminators used in the practice of this invention are preferably added to the polymerization solution in such an amount that at least one mole of phenolic hydroxyl group is present per mole of organolithium compound. An excess does not matter and contributes to the antioxidative stabilization of the polymer. It is preferred to add the chain-terminator as solution in an inert solvent.

Surprisingly, it has been found that other phenolic antioxidants can also be added simultaneously with the compound of formula I or immediately afterwards, without giving rise to discolouration of the polymers.

Representative examples of suitable phenolic antioxidants are:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

7. Esters of β-(3,5-di-tert-butyl-4-hydroxyphenyl)-propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(hydroxyethyl)oxalodiamide.

8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

10. Amides of β-(3,5-di-tert-butyl-4-hydroxyphenyl)-propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

The process of this invention is susceptible of application to the anionic solution polymerization of 1,3-dienes, especially of butadiene and isoprene, and the copolymerization thereof with styrene compounds, preferably with styrene. Organolithium compounds are used as initiators, preferably alkyl lithium compounds such as n-butyl lithium, tert-butyl lithium or isopropyl lithium. Preferred solvents are hydrocarbons such as hexane, cyclohexane or alkane mixtures. For adjustment of the stereo structure of the polymer, small amounts of a polar solvent such as tetrahydrofuran or diglyme are often added. Further details on carrying out the anionic solution polymerization of 1,3-dienes will be found in the literature, for example in Encyclopedia of Polymer Science and Engineering, Vol. 2 (1983),1–43, J. Wiley & Sons.

The following Examples show the effect of different chain-terminators on the appearance of the polymer solution. Parts and percentages are by weight.

EXAMPLE

A 2 l glass flask is charged, under nitrogen, with 760 g of dry cyclohexane, 0.07 g of tetrahydrofuran and 100 g of 1,3-butadiene. With stirring, 6.4 mmol of n-butyl lithium in the form of a 10% solution in hexane are added. The solution is heated to 70° C. and kept for 60 minutes at this temperature. Then 6.3 mmol of a chain-terminator in the form of a ca. 10% solution in cyclohexane are added. The following phenolic antioxidants are used as chain-terminators:

AO-1: 2,6-di-tert-butyl-p-cresol
AO-2: octadecyl-3,5-di-tert-butyl-4-hydroxyphenylpropionate
AO-3: 2-(3,5-di-tert-butyl-4-hydroxyphenylamino)-4,6-bis(octylthio)-1,3,5-triazine
AO-4: 2,2'-methylen-bis(6-tert-butyl-4-methylphenol)
AO-5: 2,6-di-tert-butyl-4-dodecylthiomethylphenol
AO-6: 2,4-bis(octyloxycarbonylmethylthiomethyl)-6-tert-butylphenol
AO-7: 2-methyl-4,6-bis(n-octylthiomethyl)-phenol (of the invention)
AO-8: 2,4-bis(dodecylthiomethyl)-6-methylphenol (of the invention)
AO-9: 2,4-bis(dodecylthiomethyl)-3,6-dimethylphenol (of the invention)
AO-10: reaction product of p-nonylphenol, dodecylmercaptan and formaldehyde, containing the compounds of formula I, wherein $R_4$ is hydrogen, $R_1$ is nonyl and n is 0 to 3 (of the invention).

After 5 minutes and after 60 minutes the appearance of the solution is assessed visually. The results are reported in the following table.

| Chain-terminator | Appearance of the solution after | |
|---|---|---|
| | 5 minutes | 60 minutes |
| AO-1 | pale yellow, clear | yellowish-brown, turbid |
| AO-2 | white, turbid | yellowish, turbid |
| AO-3 | yellowish-brown, turbid | brown, turbid |
| AO-4 | yellowish-brown, clear | black-brown, clear |
| AO-5 | light brown precipitate | dark brown precipitate |
| AO-6 | yellow precipitate | light brown precipitate |
| AO-7 | colourless, clear | colourless, clear |
| AO-8 | colourless, clear | colourless, clear |
| AO-9 | colourless, clear | colourless, clear |

It is evident that the solution remains clear and colourless upon addition of the compounds of this invention, whereas discolouration and turbidity (precipitation) occur when all other chain-terminators are added.

In a further test run, a mixture of 6.5 mmol of AO-7 and 6.4 mmol of AO-1 or AO-2 or AO-3 is used, while otherwise carrying out the polymerization in the same manner. In all three cases the solution also remains colourless and clear after 3 hours.

What is claimed is:

1. A process for discontinuing the organolithium-initiated anionic solution polymerization of 1,3-dienes and the copolymerization thereof with styrene compounds by addition of a chain-terminator to the polymerization solution, which process comprises using as chain-terminator at least one phenolic antioxidant of formula I

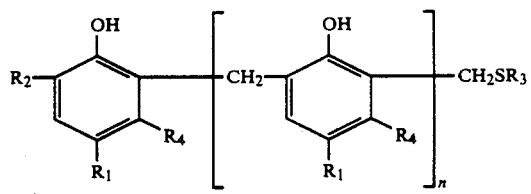

wherein n is 0 to 3, $R_1$ and $R_2$ are each independently of the other $C_1$–$C_{12}$alkyl, $C_5$–$C_8$cycloalkyl or —$CH_2SR_3$, $R_3$ is $C_1$–$C_{18}$alkyl, phenyl or benzyl, and $R_4$ is hydrogen or methyl.

2. A process according to claim 1, wherein the chain-terminator is a phenolic antioxidant of formula I, wherein n is 0 or 1, $R_1$ and $R_2$ are each independently of the other $C_1$–$C_4$alkyl or —$CH_2SR_3$, $R_3$ is $C_4$–$C_{18}$alkyl, benzyl or phenyl, and $R_4$ is hydrogen.

3. A process according to claim 2, wherein the chain-terminator is a phenolic antioxidant of formula I, wherein n is 0.

4. A process according to claim 3, wherein the chain-terminator is the compound of formula

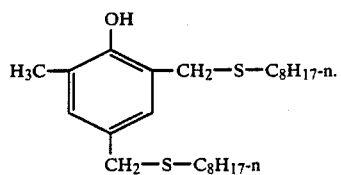

5. A process according to claim 1, which comprises adding a second phenolic antioxidant simultaneously with, or immediately after, the addition of the compound of formula I.

6. A process according to claim 1, wherein the compound of formula I is used in an amount such that one mole of phenolic hydroxylic groups is present per mole of organolithium compound used as initiator.

* * * * *